United States Patent [19]

Gibran

[11] 4,215,839
[45] Aug. 5, 1980

[54] TRIPOD

[76] Inventor: Kahlil Gibran, 160 W. Canton St., Boston, Mass. 02118

[21] Appl. No.: 949,647

[22] Filed: Oct. 10, 1978

[51] Int. Cl.² ........................................... F16M 11/38
[52] U.S. Cl. .................................. 248/170; 248/188.6
[58] Field of Search ............... 248/168, 169, 170, 171, 248/434, 435, 188.6, 177, 178, 186, 166

[56] References Cited

U.S. PATENT DOCUMENTS

| 23,428 | 3/1859 | Lemis | 248/171 |
|---|---|---|---|
| 983,589 | 2/1911 | Wendt | 248/435 X |
| 1,166,386 | 12/1915 | Perrin | 248/168 X |
| 1,894,695 | 1/1933 | Ley | 248/171 |
| 2,282,285 | 5/1942 | Olson | 248/169 |
| 2,374,021 | 4/1945 | Korling | 248/170 X |
| 2,386,266 | 10/1945 | Robertson | 248/178 X |
| 2,646,956 | 7/1963 | Cadwell et al. | 248/170 |
| 2,668,682 | 2/1954 | Dalton | 248/169 |
| 4,015,806 | 4/1977 | Cattermole | 248/168 |

FOREIGN PATENT DOCUMENTS

| 405881 | 11/1939 | Fed. Rep. of Germany | 248/170 |
|---|---|---|---|
| 7506218 | 1/1976 | Netherlands | 248/169 |

*Primary Examiner*—J. Franklin Foss
*Attorney, Agent, or Firm*—Weingarten, Maxham & Schurgin

[57] ABSTRACT

A folding and adjustable tripod for support of a camera or other apparatus and including a central column having slots extending longitudinally of the column in which the upper end of tripod legs are slidable. The legs are of fixed length and each include a slot along a portion of the length thereof within which one end of an arm is slidably adjustable, the other end of the arm being pivotably attached to the lower portion of the column. The legs are extensible by sliding within the column slots while the angular extent of the legs is adjustable by slidable adjustment of the interconnecting arms.

17 Claims, 14 Drawing Figures

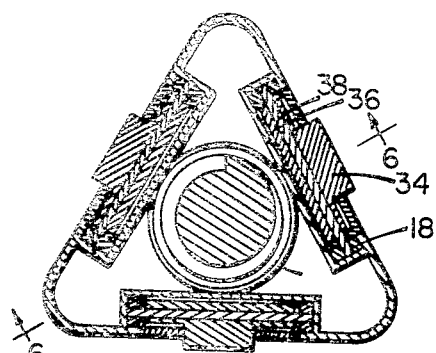
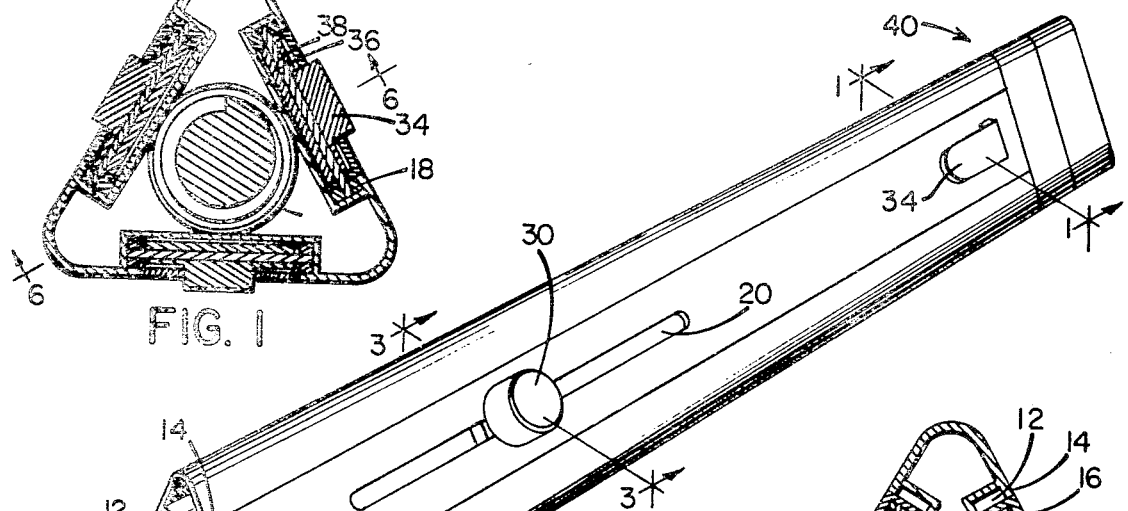
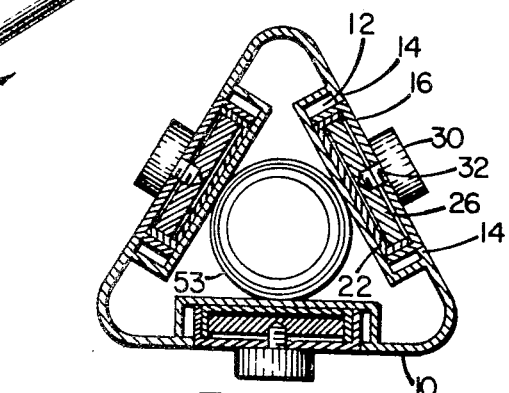
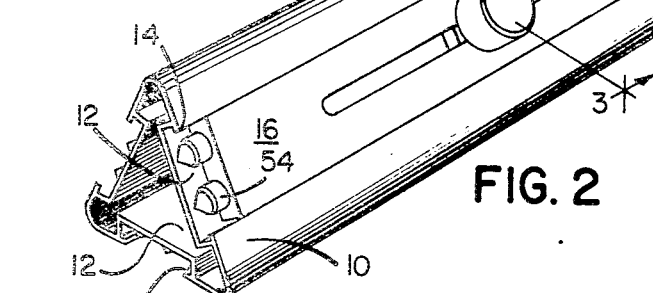
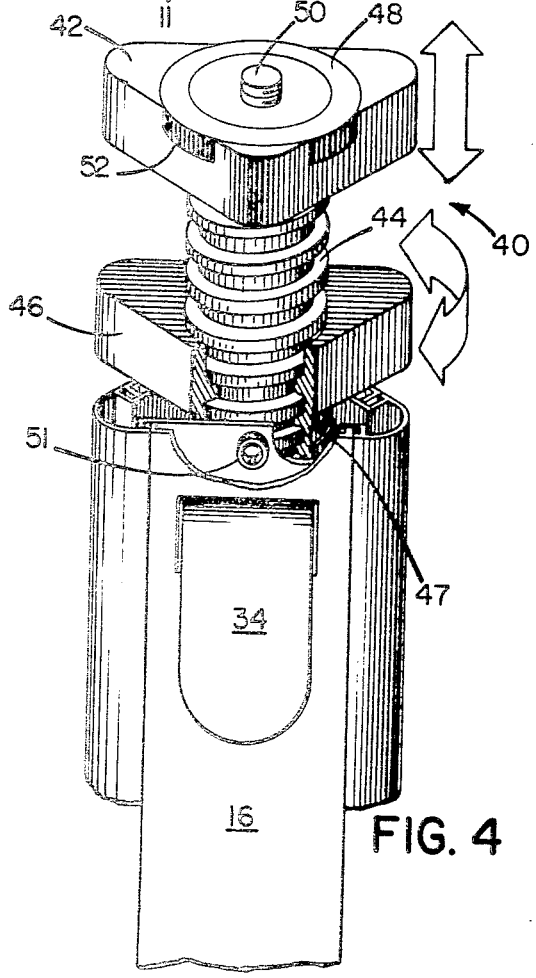
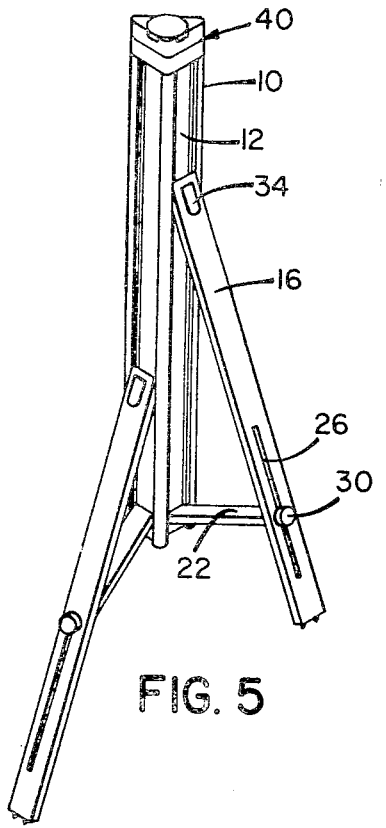

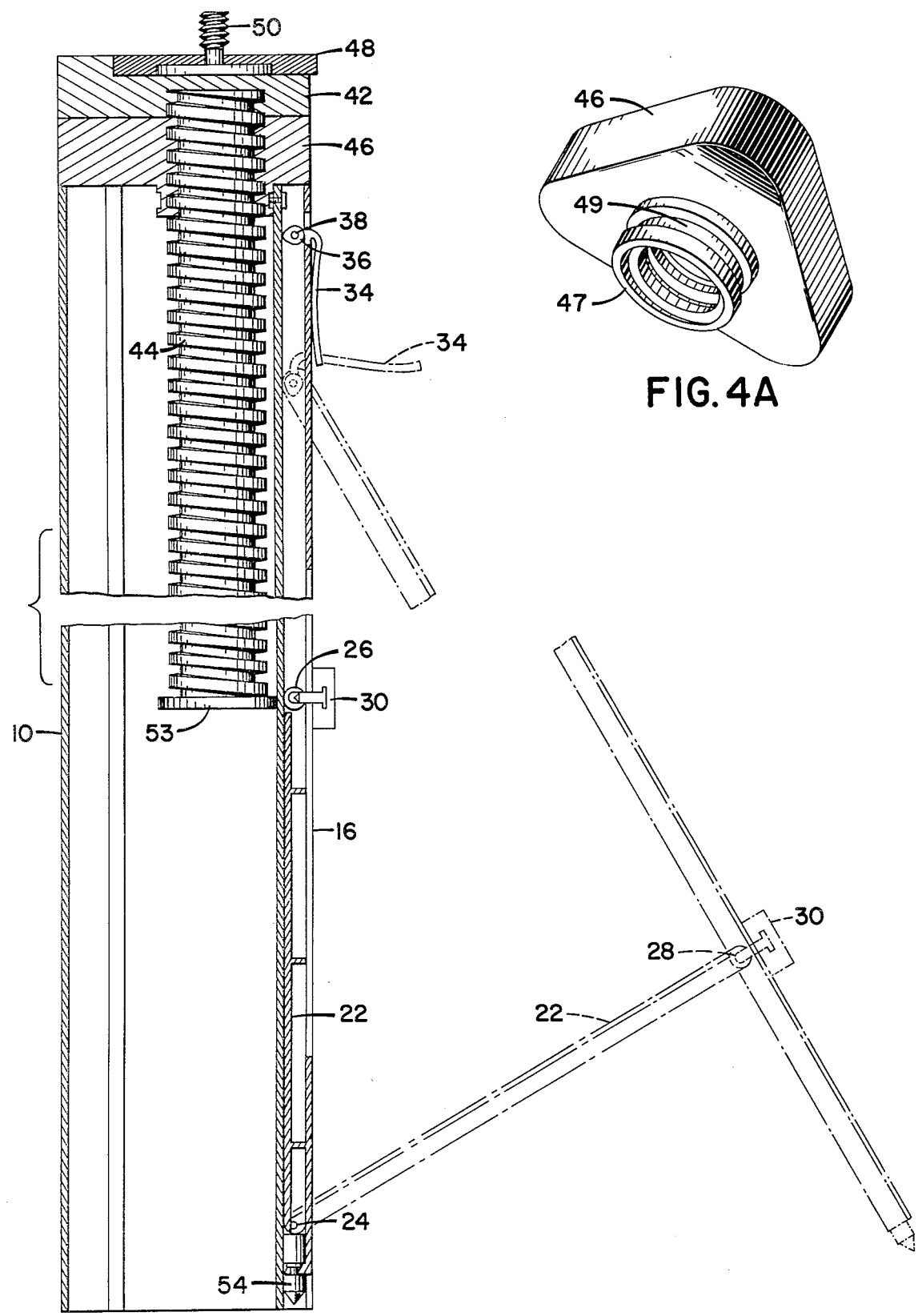

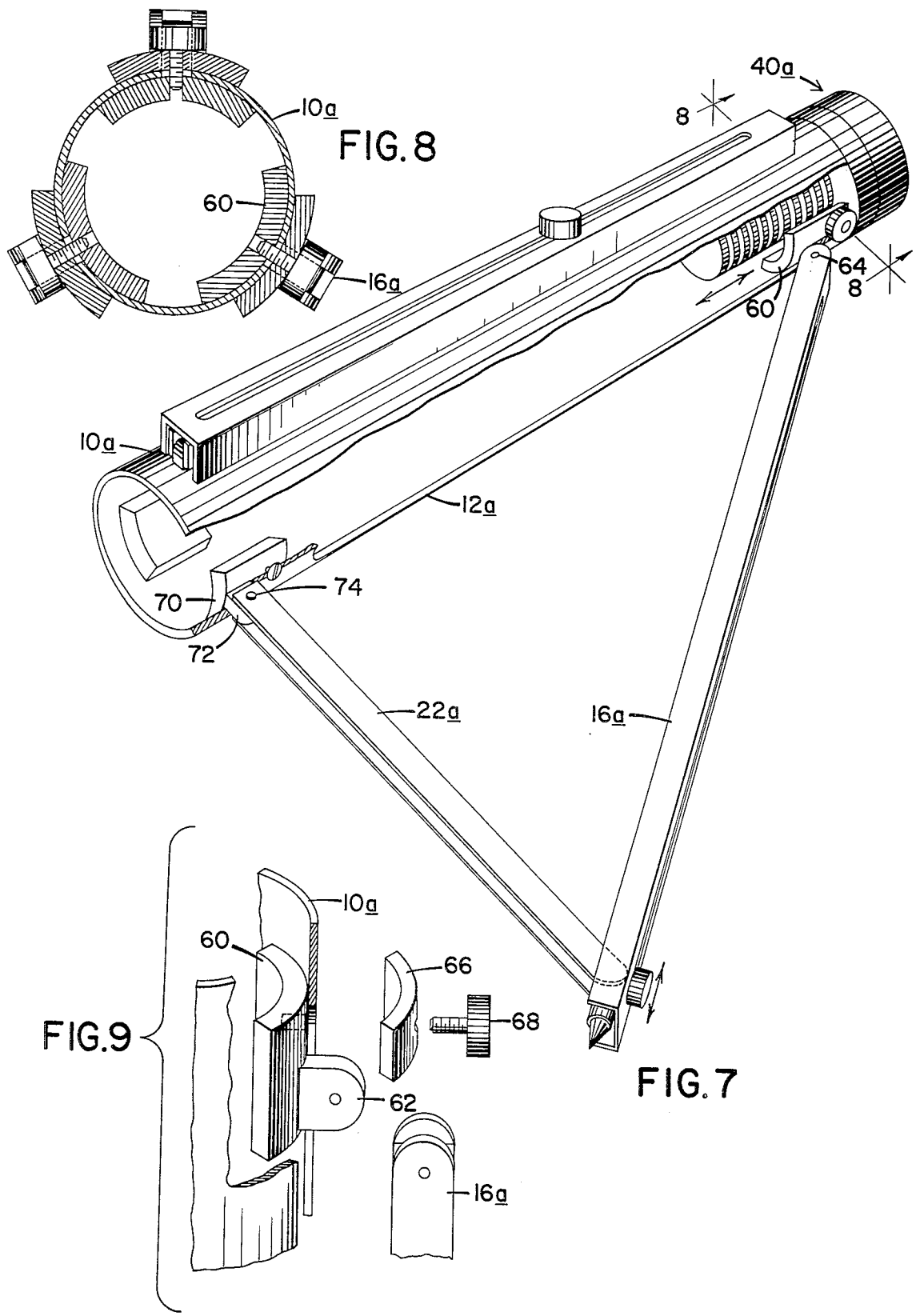

TRIPOD

FIELD OF THE INVENTION

This invention relates to tripods and more particularly to a tripod which is foldable and adjustable to intended heights.

BACKGROUND OF THE INVENTION

Most tripods employed for support of a camera or other apparatus include legs composed of multiple telescoping tubular or other sections which can be selectably extended to provide an intended tripod height. In fully extended position, the legs can be rather unstable and are often of construction which is difficult to maintain in precise locked positions. Many tripods of known construction are cumbersome when in a folded position and result in a package that can be awkward to carry and to handle, and which from an aesthetic point of view is not very attractive.

SUMMARY OF THE INVENTION

Briefly, the present invention provides a folding and adjustable tripod having a central column and legs of fixed length having upper ends slidably attached to the central column and adjustable at any position along the length thereof. An arm is associated with each leg, one end of each arm being pivotably attached to the lower portion of the central column, the other end of each arm being slidably adjustable along a portion of length of the respective leg. The legs are extensible by sliding along the length of the central column, while the angular extent of the legs is adjustable by slidable adjustment of the interconnecting arms.

DESCRIPTION OF THE DRAWINGS

The invention will be more fully understood from the following detailed description taken in conjunction with the accompanying drawings in which:

FIG. 1 is a pictorial view of the novel tripod in its folded position;

FIG. 2 is a sectional view taken along lines 2—2 of FIG. 1;

FIG. 3 is a sectional view taken along lines 3—3 of FIG. 1;

FIG. 4 is a cutaway pictorial view of the novel tripod illustrating the elevating head portion;

FIG. 4A is a pictorial view of the rotatable collar of the above embodiment;

FIG. 5 is a pictorial view of the embodiment of FIG. 1 in open position;

FIG. 6 is a sectional elevational view taken along lines 6—6 of FIG. 2 and illustrating the leg connections in phantom;

FIG. 7 is a cutaway pictorial view of another embodiment of the novel tripod;

FIG. 8 is a sectional view taken along lines 8—8 of FIG. 7;

FIG. 9 is a cutaway exploded view of the sliding locking mechanism for the legs of the embodiment of FIG. 7;

DETAILED DESCRIPTION OF THE INVENTION

Figure 10:
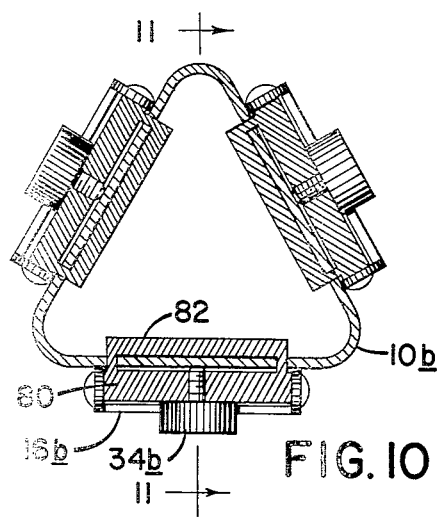
FIG. 10 is a sectional end view of a further embodiment of the novel tripod.

The novel tripod is shown in a preferred embodiment in FIGS. 1-6. With reference to these figures, the tripod includes a unitary central column 10 which preferably is extruded into intended final shape of a suitable material such as aluminum or plastic. The central column includes three slots or recesses 12 each extending along the length of the column and symmetrically spaced around the column periphery. Each slot 12 includes confronting inwardly extending lips 14. A leg 16 of fixed length is adapted for disposition within each slot 12 and includes fingers 18 which are slidably retained in the respective slot 12 under lips 14, such that the upper end of the legs 16 can be adjusted at any position along the length of respective slots 12. The legs 16 are of channel shape and typically are of the same material as that of column 10. A longitudinal slot 20 is provided through each leg 16 along a predetermined length therof.

An arm 22 adjustably interconnects each leg 16 with the lower portion of column 10. Each arm is pivotally attached to the lower portion of column 10 at the bottom of respective slot 12 such as by an axle 24 extending transversely through the flanges of arm 22 and into openings provided in the confronting walls of slot 12, as seen in FIG. 6. The outer end of each arm 22 is slidably and pivotably attached to the associated leg 16. A bar 26 is disposed at the outer end of each arm 22 and is pivotably attached to the side flanges of the arm by means of a pivot pin 28. An adjustment knob 30 has a threaded shaft 32 which extends through slot 20 of the leg and into a threaded opening provided in bar 26. By loosening knob 30, the associated arm 22 can be adjusted anywhere along the slot 20, and the knob then tightened to provide a selected extended and angular position for the corresponding leg.

The upper ends of the legs 16 are secured at intended positions along the respective slots 12 by means of respective adjustment levers 34. Each lever 34 includes an elliptical rod 36 pivotally attached to the side flanges of leg 16 by means of a pivot pin 38. In downward or closed position of lever 34, bar 36 is cammed against the confronting surfaces of leg 16 and slot 12 to lock the leg in position at an intended location along the length of the slot. With the lever 34 in its raised or open position, the bar 36 is pivoted out of camming engagement to permit slidable adjustment of the leg along its slot. The tripod is adjustable singly by use of the three adjustment levers 34 and three adjustment knobs 30. In folded position, the legs 16 are disposed within the confines of slots 12 to provide a compact unit in which the legs are retained within the central column and do not protrude in an awkward or unsightly manner.

The upper end of the tripod includes an elevating head assembly 40 which includes a mounting plate 42 of the same generally triangular configuration as the central column 10, and having a threaded shaft 44 disposable within the central channel of column 10, with an adjustment collar 46 threadably attached to shaft 44. The adjustment collar 46 is also of the same configuration as column 10 such that the tripod including collar 46 and mounting plate 42 present a uniform and streamlined appearance without protruding and encumbering hardware. The collar 46 includes a circular flange 47 having an annular groove 49 in which set screws 51 are disposed to allow rotation of the collar and retain the collar in position in column 10. A teflon or other suitable ring 53 is disposed at the bottom end of threaded shaft 44 and is in rotatable engagement with the confronting surfaces of column 10 to serve as an alignment bearing and as an upward stop on the travel of shaft 44.

A thumb wheel 48 and mounting screw 50 are retained by any convenient means in mounting plate 42 for attachment to the tapped hole of a camera or other item which is to be mounted on the tripod. The thumb wheel includes peripheral portions 52 which extend outward of openings in the side surfaces of the mounting plate to provide annual access for locking and unlocking a camera or other item to the tripod by rotation of the thumb wheel. A pan head can, if desired, be attached to plate 42 to provide panning movement in elevation and azimuth.

The lower end of each leg 16 includes one or more mounting feet 54, typically formed of a resilient material to provide non-slip engagement with a floor or other mounting surface. It will be appreciated that mounting feet of different configurations can be provided to suit the type of surface on which the tripod is used. For example, mounting feet of relatively sharp spike-like configuration can be employed for mounting on soft ground.

Another embodiment of the novel tripod is shown in FIGS. 7-9 wherein the central column 10a is of cylindrical configuration. Each leg 16a is adjustably secured at its upper end to a slot 12a by means of a curved plate 60 disposed inside column 10a and having an ear 62 extending through slot 12a and to which the upper end of leg 16a is pivotally attached such as by a pivot pin 64. A curved plate 66 is disposed on the outside of column 10a and is secured to the column and to plate 60 by means of a threaded knob 68 which extends through a hole in plate 66, through slot 12a and into a threaded hole in plate 60. By tightening knob 68, plates 60 and 66 are clamped into engagement with a confronting wall portion of the column 10a to lock the upper portion of leg 16a at an intended position along the length of the slot. The lower end of each leg 16a is adjustably attached to the confronting end of a respective arm 22a in the same manner as described above. The inner end of each arm 22a is pivotally attached to the lower portion of column 10a such as by means of a mounting plate 70 attached inside of column 10a and having an ear 72 extending outwardly through an opening in the column into which the arm 22a is pivotally attached via a pin 74.

Figure 11:
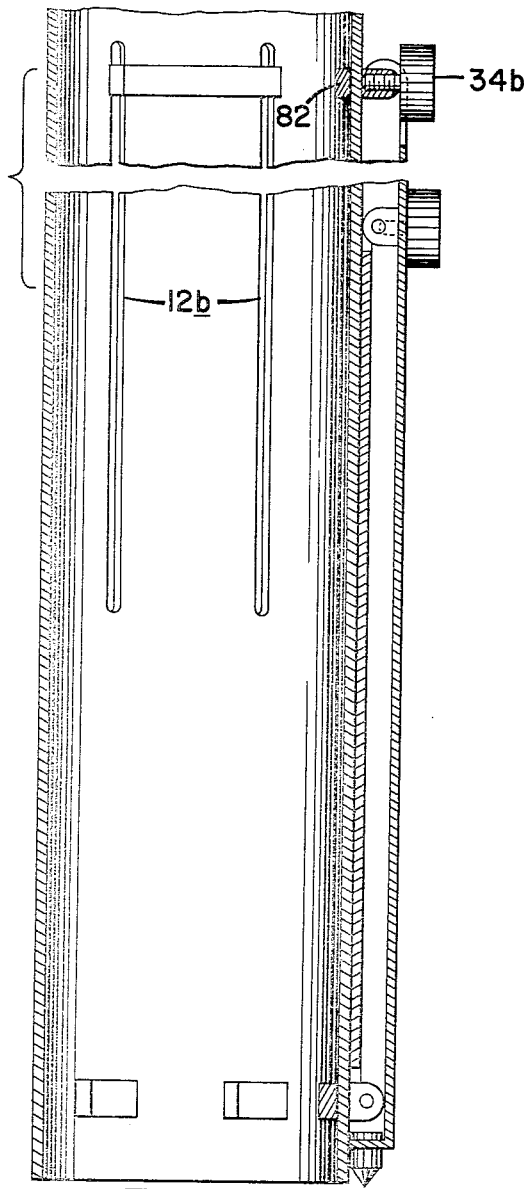
FIG. 11 is a sectional elevation view taken along lines 11—11 of FIG. 10.
Figure 12:
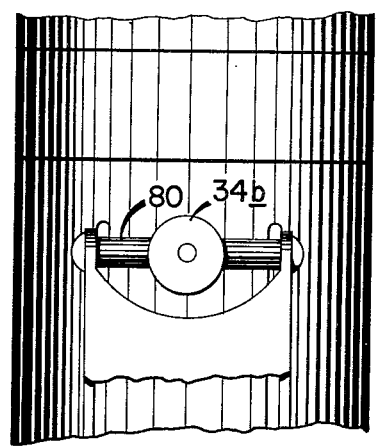
FIG. 12 is a cutaway elevation view of the embodiment of FIG. 10.

Another embodiment of the novel tripod is illustrated in FIGS. 10-12. In this embodiment, the central column is of generally triangular configuration and is again preferably extruded of aluminum or other suitable material. The legs 16b are disposed external of each confronting surface of the central column and are secured to the central column by means of a pair of longitudinal slots 12b extending along a predetermined length of the central column. Each leg 16b is adjustable at its upper end by means of an adjustment knob 34b which is threaded through axle 80 into a bar 82 disposed within column 10b.

Figure 13:
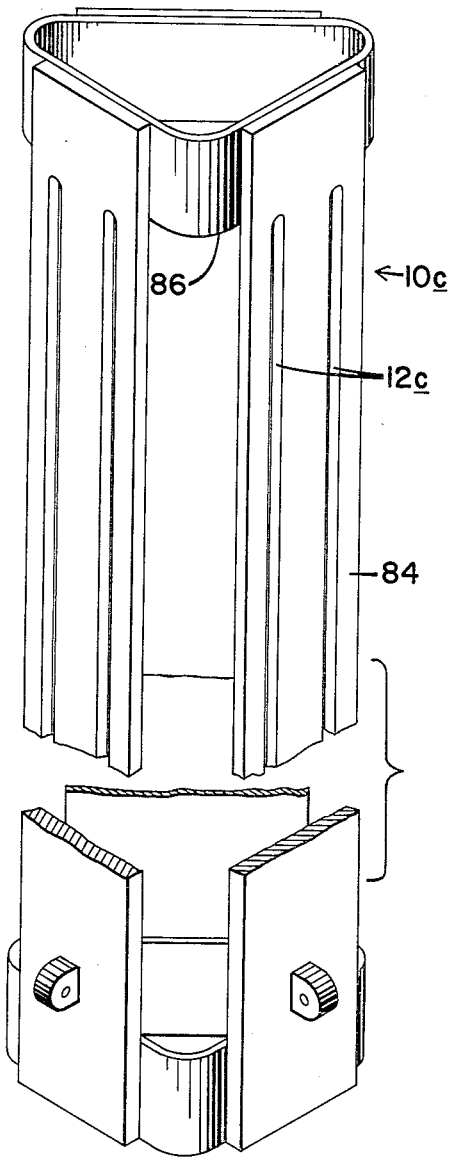
FIG. 13 is a cutaway pictorial view of a further embodiment of the novel tripod.

Yet another embodiment is shown in FIG. 13 in which the central column 10c is formed of interconnected elements rather than being of one-piece construction as in the above embodiments. As seen in FIG. 13, the central column 10c includes three rectangular plates 84 each having a pair of longitudinal slots 12c extending along a predetermined length thereof and each welded or otherwise affixed to triangular members 86. The tripod legs and interconnecting arms are affixed in similar manner as described above.

It will be appreciated that various modifications and alternative implementations can be made without departing from the spirit of the invention. Accordingly, it is not intended to limit the invention by what has been particularly shown and described except as indicated in the appended claims.

What is claimed is:

1. A tripod comprising:
    a central column having at least three slots extending substantially in parallel along a portion of the column length and peripherally spaced around the column;
    mounting means at the upper end of the column for attachment of an item to be supported;
    three legs each of the same fixed length and each disposed along a respective slot, each leg having a slot along a portion of the length thereof and each including;
    means slidably disposed in a respective slot of the central column and pivotably attached to the upper end of the leg;
    means for locking the upper end of the leg at any position along the length of the column slot;
    an arm having one end pivotably attached to the column near the lower end thereof and having an opposite end pivotably attached to the slot of the leg and slidable therealong; and
    means for locking the arm at any position along the length of the leg slot;
    the legs being operative to be folded aginst the column with the arms nested in the legs, and operative to be opened to an intended angular extent and to an intended vertical extent along the length of the column;
    and at any vertical extent of said legs along the length of the column, the angular extent of any of said legs can be adjusted by the position of the respective arms along the associated leg slots.

2. The tripod of claim 1 wherein said central column is of unitary construction having a generally triangular cross-section with a slot extending along the length of each face.

3. The tripod of claim 1 wherein the central column is of unitary tubular configuration.

4. The tripod of claim 1 wherein said central column includes three rectangular plates each having at least one longitudinal slot extending along a predetermined length thereof, and a plurality of support members affixed to the rectangular plates and supporting said plates symmetrically about a longitudinal axis of the column.

5. The tripod of claim 1 wherein said central column is an extruded tubular member of generally triangular cross-section and a slot of generally rectangular cross-section extending along the length of each face;
    and wherein each of said legs is of generally rectangular cross-section adapted to be disposed within a respective slot of the central column such that in the closed position, the legs are nested within the central column.

6. The tripod of claim 5 wherein each of said legs and each of said arms is formed of channel members.

7. The tripod of claim 5 wherein said means slidably disposed in each central column slot includes means attached to the upper end of the leg and slidably retained in the respective column slot;

and wherein said means for locking the upper end of the leg includes a manually operable element and means operative upon actuation of said element for clamping the upper end of the leg in the column slot.

8. The tripod of claim 1 wherein each of said legs includes a non-skid foot on the bottom end thereof.

9. The tripod of claim 1 wherein said mounting means includes an elevating head assembly comprising:

a mounting plate for attachment of an item to be supported;

a threaded shaft disposable within the central column and having said mounting plate attached to the upper end thereof; and an adjustment collar rotatably attached to the upper end of the central column and threadably attached to the shaft and rotatable to raise and lower the shaft and mounting plate.

10. The tripod of claim 9 wherein said mounting plate and adjustment collar are of the same cross-sectional configuration as the central column.

11. The tripod of claim 9 wherein said collar includes a grooved circular flange rotatably disposed in the upper end of said central column; and means cooperative with said grooved flange to permit rotation thereof and to retain said collar on the central column.

12. The tripod of claim 11 wherein said threaded shaft includes an annular ring at the bottom end thereof in rotatable engagement with the confronting surfaces of the central column.

13. The tripod of claim 9 wherein said collar is of the same cross-sectional configuration as the central column.

14. The tripod of claim 1 wherein said means for locking the upper end of the leg includes a manually operable lever and camming means operative with the lever in a locked position to engage confronting surfaces of the leg and the column slot.

15. The tripod of claim 1 wherein said means for locking the arm includes a manually operable knob and means for engaging the arm and leg slot.

16. The tripod of claim 1 wherein said mounting means includes an elevating head assembly comprising:

a mounting plate for attachment of an item to be supported;

a shaft disposable within the central column and having said mounting plate attached to the upper end thereof; and a collar attached to the upper end of the central column and adjustably attached to the shaft and operative to permit raising and lowering of the shaft and mounting plate.

17. The tripod of claim 16 wherein the shaft includes an element at the bottom end thereof and operative as an upward stop to limit the raising of the shaft.

* * * * *